United States Patent
O'Donnell et al.

(10) Patent No.: US 9,551,366 B2
(45) Date of Patent: Jan. 24, 2017

(54) ACCESSORY ATTACHMENT SYSTEM FOR MACHINE

(71) Applicant: Caterpillar Inc., Peoria, IL (US)

(72) Inventors: Timothy M. O'Donnell, Germantown Hills, IL (US); Charles R. Riggert, Metamora, IL (US); Wesley C. Reetz, Washington, IL (US); Daniel W. Hoyt, Brimfield, IL (US)

(73) Assignee: Caterpillar Inc., Peoria, IL (US)

(*) Notice: Subject to any disclaimer, the term of this patent is extended or adjusted under 35 U.S.C. 154(b) by 231 days.

(21) Appl. No.: 14/302,869

(22) Filed: Jun. 12, 2014

(65) Prior Publication Data

US 2015/0360626 A1 Dec. 17, 2015

(51) Int. Cl.
| | |
|---|---|
| *F15B 21/00* | (2006.01) |
| *E02F 3/96* | (2006.01) |
| *E02F 9/08* | (2006.01) |
| *E02F 9/22* | (2006.01) |
| *B60K 25/06* | (2006.01) |

(52) U.S. Cl.
CPC ............... *F15B 21/00* (2013.01); *B60K 25/06* (2013.01); *E02F 3/961* (2013.01); *E02F 9/0858* (2013.01); *E02F 9/2275* (2013.01); *B60K 2025/065* (2013.01); *B60Y 2200/411* (2013.01)

(58) Field of Classification Search
CPC ......... F15B 21/00; E02F 3/961; E02F 9/0858; E02F 9/2275; E02F 3/963; B60K 2025/065; B60K 25/06
See application file for complete search history.

(56) References Cited

U.S. PATENT DOCUMENTS

| | | | | |
|---|---|---|---|---|
| 3,861,505 A | * | 1/1975 | Sugimura | B65H 75/425 191/12.2 R |
| 4,582,141 A | * | 4/1986 | van der Lely | A01B 67/00 172/3 |
| 4,878,544 A | | 11/1989 | Barnhart | |
| 5,471,908 A | * | 12/1995 | Lech | E02F 9/2221 60/424 |
| 5,809,779 A | * | 9/1998 | Bruso | B09C 1/00 405/128.45 |
| 5,860,232 A | * | 1/1999 | Nathenson | E02F 3/92 15/300.1 |
| 5,957,213 A | * | 9/1999 | Loraas | E02F 3/96 111/101 |

(Continued)

*Primary Examiner* — Paul N Dickson
*Assistant Examiner* — Timothy Wilhelm

(57) ABSTRACT

An accessory attachment system for a machine is disclosed. The accessory attachment system includes a housing configured to be detachably coupled with the machine. A plurality of electric connectors is disposed in the housing. The plurality of electric connectors is communicably coupled with an electrical system of the machine. The plurality of electric connectors is configured to selectively provide an electric power to one or more detachable external devices. A fluid connector is disposed in the housing. The fluid connector is in fluid communication with a hydraulic system of the machine. The accessory attachment system further includes a hydraulic device detachably coupled with the housing. The hydraulic device includes a device fluid connector configured to be fluidly coupled with the fluid connector of the housing. The hydraulic device is selectively powered by the hydraulic system of the machine.

17 Claims, 6 Drawing Sheets

(56) References Cited

U.S. PATENT DOCUMENTS

| | | | | |
|---|---|---|---|---|
| 6,138,069 A * | 10/2000 | Ellertson | | A01B 67/00 |
| | | | | 701/50 |
| 6,202,330 B1 * | 3/2001 | Bolton | | B01D 50/002 |
| | | | | 175/67 |
| 6,405,815 B1 * | 6/2002 | Stoever | | B60K 25/00 |
| | | | | 137/594 |
| 6,493,967 B2 * | 12/2002 | Holmes | | E02F 3/962 |
| | | | | 37/468 |
| 6,662,881 B2 * | 12/2003 | Domann | | E02F 3/3609 |
| | | | | 172/272 |
| 6,834,634 B2 * | 12/2004 | Lawrence | | F02F 7/0007 |
| | | | | 123/195 A |
| 7,231,994 B2 | 6/2007 | Buglione et al. | | |
| 7,503,134 B2 * | 3/2009 | Buckner | | E01H 1/0827 |
| | | | | 15/300.1 |
| 7,673,713 B2 * | 3/2010 | Betz | | B60L 1/003 |
| | | | | 180/65.1 |
| 8,047,760 B2 * | 11/2011 | Roan | | E02F 3/34 |
| | | | | 414/686 |
| 8,528,675 B2 * | 9/2013 | Cherney | | E02F 9/0858 |
| | | | | 180/65.22 |
| 9,160,208 B2 * | 10/2015 | Murata | | E02F 9/0858 |
| 2006/0037220 A1 * | 2/2006 | Cunningham | | E02F 3/3618 |
| | | | | 37/468 |
| 2006/0120848 A1 * | 6/2006 | Guhr | | E02F 3/96 |
| | | | | 414/723 |
| 2009/0171482 A1 * | 7/2009 | Mindeman | | E02F 3/3604 |
| | | | | 700/83 |
| 2010/0092233 A1 * | 4/2010 | Roan | | E02F 3/34 |
| | | | | 403/14 |
| 2013/0099558 A1 * | 4/2013 | Hart | | F02D 29/06 |
| | | | | 307/9.1 |
| 2014/0225374 A1 * | 8/2014 | Collett | | B60L 11/14 |
| | | | | 290/1 A |
| 2014/0291045 A1 * | 10/2014 | Collett | | B60K 25/06 |
| | | | | 180/53.4 |

* cited by examiner

ACCESSORY ATTACHMENT SYSTEM FOR MACHINE

TECHNICAL FIELD

The present disclosure relates to an accessory attachment system for a machine.

BACKGROUND

Machines such as, construction, agriculture, transportation and mining machines include an electrical system powered by a power source of the machine. The electrical system may provide power to motors that are coupled with ground engaging members to propel the machine. The machines also include a hydraulic system powered by the power source. The hydraulic system and/or the electrical system may drive various implements of the machine. These implements are generally used to perform various tasks such as, digging, dozing, loading, tilling, hauling and other similar tasks.

In addition to these predefined tasks, there may be additional and/or different types of tasks that need to be performed at a worksite. These tasks may require many different pieces of equipment that need to be arranged alongside the machines and maintained at the worksite. Further, transporting and maintaining this additional equipment may increase the operational cost of the worksite. Therefore, it may be desirable to enhance the functionality and usage of a single machine for performing multiple purposes within the worksite. However, the power source for the electrical system and the hydraulic system within each of the machines may not be directly usable for performing these additional tasks.

U.S. Pat. No. 7,673,713 discloses a dual purpose mobile machine. The mobile machine may have a power source configured to propel the mobile machine and generate electric power for off-board use of the mobile machine. The machine may also have a work tool driven by the power source.

SUMMARY OF THE DISCLOSURE

In one aspect of the present disclosure, an accessory attachment system for a machine is disclosed. The accessory attachment system includes a housing configured to be detachably coupled with the machine. A plurality of electric connectors disposed in the housing. The plurality of electric connectors is communicably coupled with an electrical system of the machine. The plurality of electric connectors is configured to selectively provide electric power to one or more detachable external devices. A fluid connector is disposed in the housing. The fluid connector is in fluid communication with a hydraulic system of the machine. The accessory attachment system further includes a hydraulic device detachably coupled with the housing. The hydraulic device includes a device fluid connector configured to be fluidly coupled with the fluid connector of the housing. The hydraulic device is selectively powered by the hydraulic system of the machine.

In another aspect of the present disclosure, a machine is disclosed. The machine includes a frame. A power source is disposed within the frame. An electrical system and a hydraulic system are powered by the power source. The machine further includes an accessory attachment system detachably coupled with the frame of the machine. The accessory attachment system includes a housing configured to be detachably coupled with the machine. A plurality of electric connectors is disposed in the housing. The plurality of electric connectors being communicably coupled with the electrical system of the machine. The plurality of electric connectors is configured to selectively provide electric power to one or more detachable external devices. A fluid connector is disposed in the housing. The fluid connector is being in fluid communication with the hydraulic system of the machine. The accessory attachment system further includes a hydraulic device detachably coupled with the housing. The hydraulic device includes a device fluid connector configured to be fluidly coupled with the fluid connector of the housing. The hydraulic device is selectively powered by the hydraulic system of the machine.

In yet another aspect of the present disclosure, an accessory attachment module for a machine is disclosed. The accessory attachment module includes a housing configured to be detachably coupled to a frame of the machine. The housing includes one or more junctions for cooperation with one or more machine systems. The housing further includes one or more connectors which are configured for connection of one or more external devices. The one or more connectors provide communication between the one or more machine systems and the one or more external devices.

Other features and aspects of this disclosure will be apparent from the following description and the accompanying drawings.

DETAILED DESCRIPTION

Figure 1:
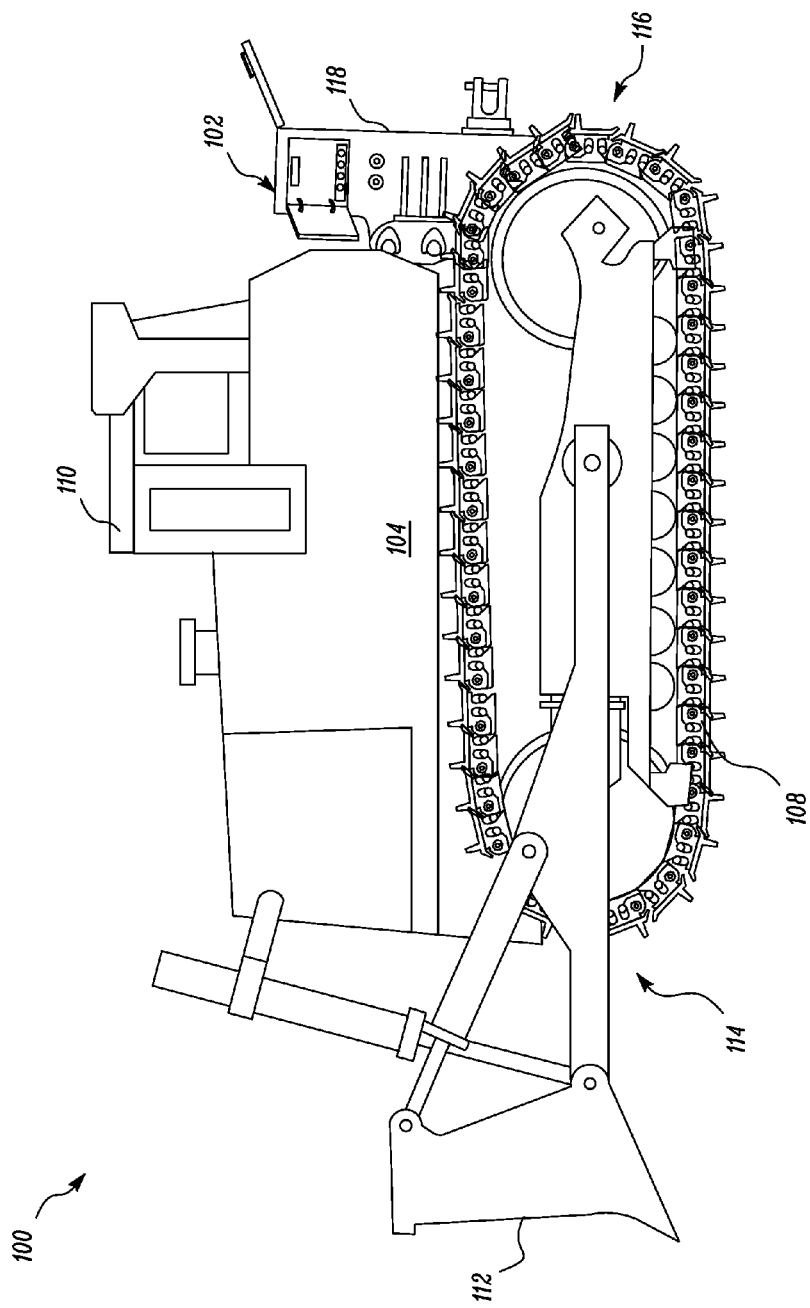
FIG. 1 is a side view of an exemplary machine including an accessory attachment system, according to an embodiment of the present disclosure.

FIG. 1 illustrates an exemplary machine 100 having an accessory attachment system 102, according to an embodiment of the present disclosure. The machine 100 may be a mobile machine that performs operations associated with an industry such as mining, construction, farming, transportation, or any other industrial operations known in the art. In the embodiment of FIG. 1, the machine 100 is a track type tractor. In various alternative embodiments, the machine 100 may be any other on-road and off-road machine such as, a backhoe loader, a wheel loader, a compactor, an excavator, a large mining truck, or any other agricultural, mining or construction machinery employing wheels or tracks.

The machine 100 includes a frame 104 for supporting a drive system of the machine 100. The drive system may be further configured to drive ground engaging members 108 of the machine 100. The drive system of the machine 100 may include an electrically actuated drive system or a mechanically actuated drive system. In the embodiment of FIG. 1, the ground engaging members 108 include a pair of tracks. However, in alternative embodiments, the ground engaging members 108 may be, for example, wheels or any other traction driven devices. The machine 100 further includes an operator cab 110 that may be mounted on the frame 104. The operator cab 110 may include various machine and work implement operating controllers. For example, the machine operating controllers may include hand operated levers for controlling a work implement 112. The work implement 112 may be disposed at a front end 114 of the machine 100. Further, the machine operating controller may include one or more pedals and levers for controlling movement of the machine 100. The operator cab 110 may also include various other machine operating controllers for operating various components associated with the drive system, the work implement 112 and the accessory attachment system 102 of the machine 100. In the embodiment of FIG. 1, the accessory attachment system 102 is detachably coupled with the frame 104 of the machine 100. The accessory attachment system 102 may include a housing 118 to detachably couple to a rear end 116 of the frame 104.

Figure 2:
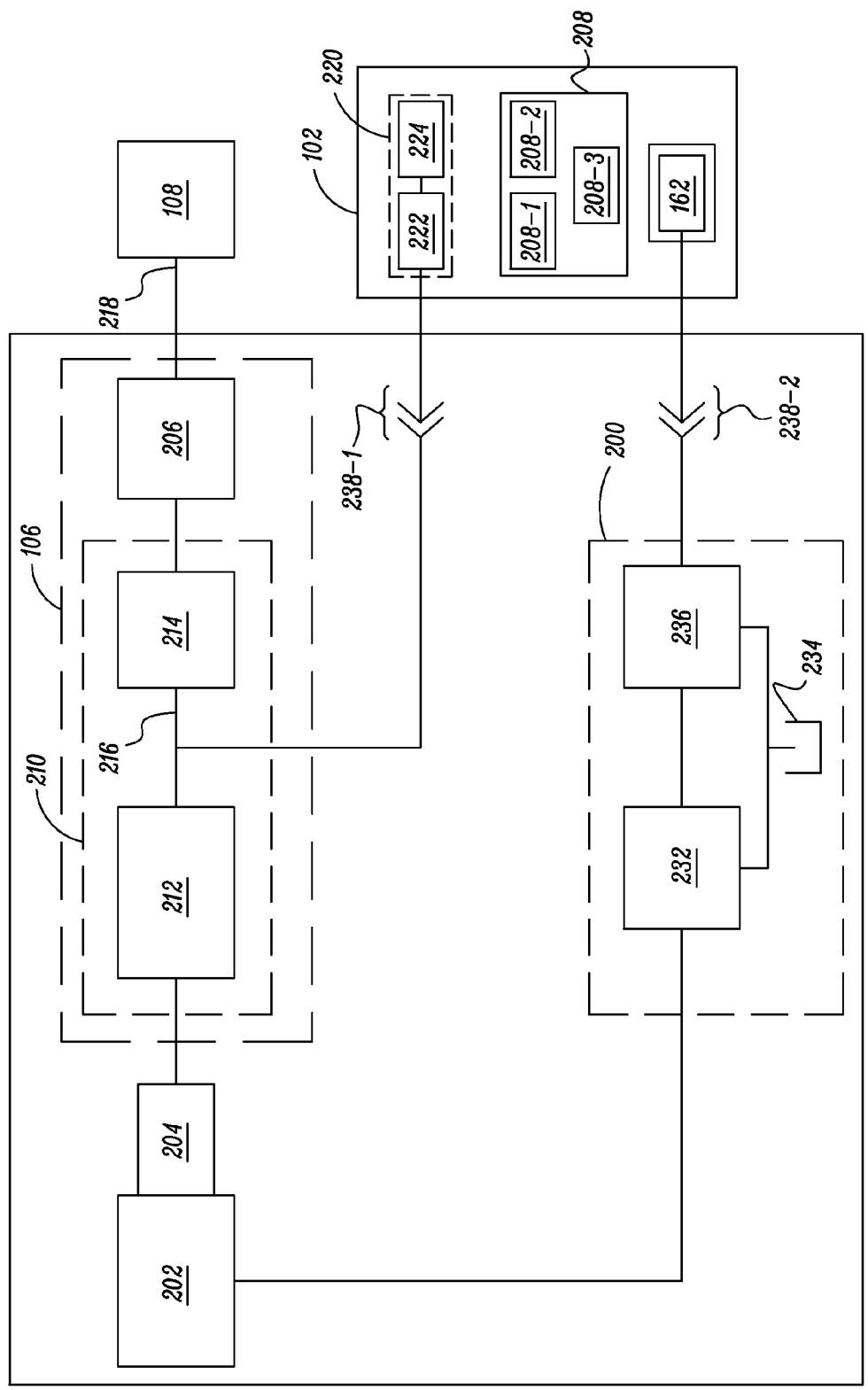
FIG. 2 is a block diagram illustrating an embodiment of the present disclosure in combination with an electrical system and a hydraulic system of the machine.

FIG. 2 shows a block diagram illustrating an electrical system 106 and a hydraulic system 200 associated with the accessory attachment system 102 of the machine 100, according to an embodiment of the present disclosure. The electrical system 106 includes a power source 202. The power source 202 may be an internal combustion engine that generates power. The internal combustion engine may be powered by, for example, diesel, gasoline, gaseous fuel, or a combination of liquid fuel and gaseous fuel. The engine may include a single cylinder or multiple cylinders. The multiple cylinders may be arranged in various configurations, such as, inline, rotary, or v-type. In various other embodiments, the power source 202 may include an electric energy storing device, for example, a fuel cell and a battery, to provide the power to drive the machine 100.

The power source 202 is drivably coupled to a generator 204. The generator 204 may be a three-phase alternating field-type generator configured to produce a first alternating current (AC) voltage output in response to the power from the power source 202. Further, the generator 204 may be electrically connected to a primary power converter unit 210. The primary power converter unit 210 may include a rectifier 212 and an inverter 214. The inverter 214 may be electrically connected to the rectifier 212 by a direct current (DC) bus 216. The rectifier 212 may be configured to convert the first AC voltage output from the generator 204 to a first DC voltage output. The inverter 214 may be configured to convert the first DC voltage output from the rectifier 212 to a second AC voltage output of variable frequency. It may be contemplated that the second AC voltage output is of variable frequency to provide varying operational demands of the ground engaging members 108. The inverter 214 may be further electrically connected to a motor 206.

The motor 206 may be configured to receive the second AC voltage output at variable frequency from the inverter 214 to operate the ground engaging members 108. The motor 206 may be a permanent magnet alternating field-type motor configured to receive power from the inverter 214 to drive the ground engaging members 108. It may also be contemplated that the motor 206 may supply power to the DC bus 216 during a power regeneration event (e.g., when gravity or momentum acting on the ground engaging member 108 drives the motor 206). Although only a single motor 206 is illustrated in FIG. 2, it may be contemplated that multiple motors 206 may be included within the machine 100 to drive the ground engaging members 108. The motor 206 may be drivably coupled to the ground engaging members 108 through a direct mechanical connection 218 or through an indirect connection (not shown) such as a reducing gear arrangement.

In an embodiment, the accessory attachment system 102 includes an auxiliary power converter unit 220 configured for connection to the electrical system 106. The auxiliary power converter unit 220 may be disposed within the housing 118 of the accessory attachment system 102. The auxiliary power converter unit 220 may be electrically connected to the DC bus 216 within the primary power converter unit 210. The auxiliary power converter unit 220 includes a second inverter 222 configured to be connected to the DC bus 216 between the rectifier 212 and the inverter 214 within the primary power converter unit 210. The second inverter 222 receives the first DC voltage output from the rectifier 212 via the DC bus 216 and converts it to a third AC voltage output of predefined fixed frequency and magnitude. In an embodiment, the predefined fixed frequency may be a standard frequency within a range of 50 Hz to 65 Hz usable by external electric devices.

The auxiliary power converter unit 220 further includes a harmonic filter unit 224 configured to smoothen the third AC voltage output from the second inverter 222. It may be contemplated that the harmonic filter unit 224 is configured to enhance the power output quality of the third AC voltage output by reducing undesirable harmonic content in the third AC voltage output in order to meet the power quality requirements for electrical loads. The auxiliary power converter unit 220 is further configured to be electrically connected to three electric power interfaces 208-1, 208-2, 208-3. The electric power interface 208-1, 208-2, 208-3 may be collectively referred as the electric power interface 208. Although, the embodiment of FIG. 2 may includes three electric power interfaces 208-1, 208-2, 208-3, it may be contemplated that the accessory attachment system 102 may include any number of electric power interfaces within the scope of the present disclosure. In various embodiments, the auxiliary power converter unit 220 may be configured with phase converters such as static or rotary phase converter. The phase converters may be configured to convert the electric power received in a single phase in the electric power interface 208 into a three phase or vice versa.

In an embodiment, the exemplary hydraulic system 200 of the machine 100 may include a pump 232. The pump 232 may be drivably coupled with the power source 202 for receiving a power therefrom. The pump 232 may be in fluid communication with a fluid reservoir 234 for receiving a fluid therefrom upon actuation of the pump 232 based on the power received from the power source 202. The fluid reservoir 234 may be supported on the frame 104 of the machine 100. However, the fluid reservoir 234 may be alternatively disposed at any location in the machine 100. The pump 232 may be further fluidly coupled with a valve 236. The valve 236 may be further fluidly coupled to the accessory attachment system 102. The valve 236 may also be fluidly communicated with the fluid reservoir 234 for discharging the fluid to the fluid reservoir 234 when the pump 232 is operational and the valve 236 is not actuated. The valve 236 may be an electrically actuated valve in response to a control signal received from a controller (not shown) of the machine 100. Upon actuation of the valve 236, the fluid from the fluid reservoir 234 may be received by the pump 232 to communicate with the accessory attachment system 102 via the valve 236. Although, in the embodiment of FIG. 2, the hydraulic system 200 includes the pump 232 in fluid communication with the fluid reservoir 234 and the valve 236, in various alternative embodiments, the hydraulic system 200 may further include one or more additional pumps (not shown) and valves. The additional pumps and valves may be configured to operate the work implement 112 of the machine 100. The hydraulic system 200 may also include other hydraulic components including, but not limited to, fluid filter, pressure regulator, etc. for operatively communicating the fluid with the accessory attachment system 102.

The accessory attachment system 102 may include one or more junctions 238 to provide an interface for detachable coupling with machine systems, such as the electrical system 106 and/or the hydraulic system 200. In an embodiment, the auxiliary power converter unit 220 of the accessory attachment system 102 may be detachably coupled to the DC bus 216 within the primary power converter unit 210 of the machine 100 via a first junction 238-1. The first junction 238-1 may enable the accessory attachment system 102 to cooperate with the electrical system 106 of the machine 100. Further, the accessory attachment system 102 may include a second junction 238-2. The second junction 238-2 may enable the accessory attachment system 102 to cooperate with the hydraulic system 200 of the machine 100.

Figure 3:
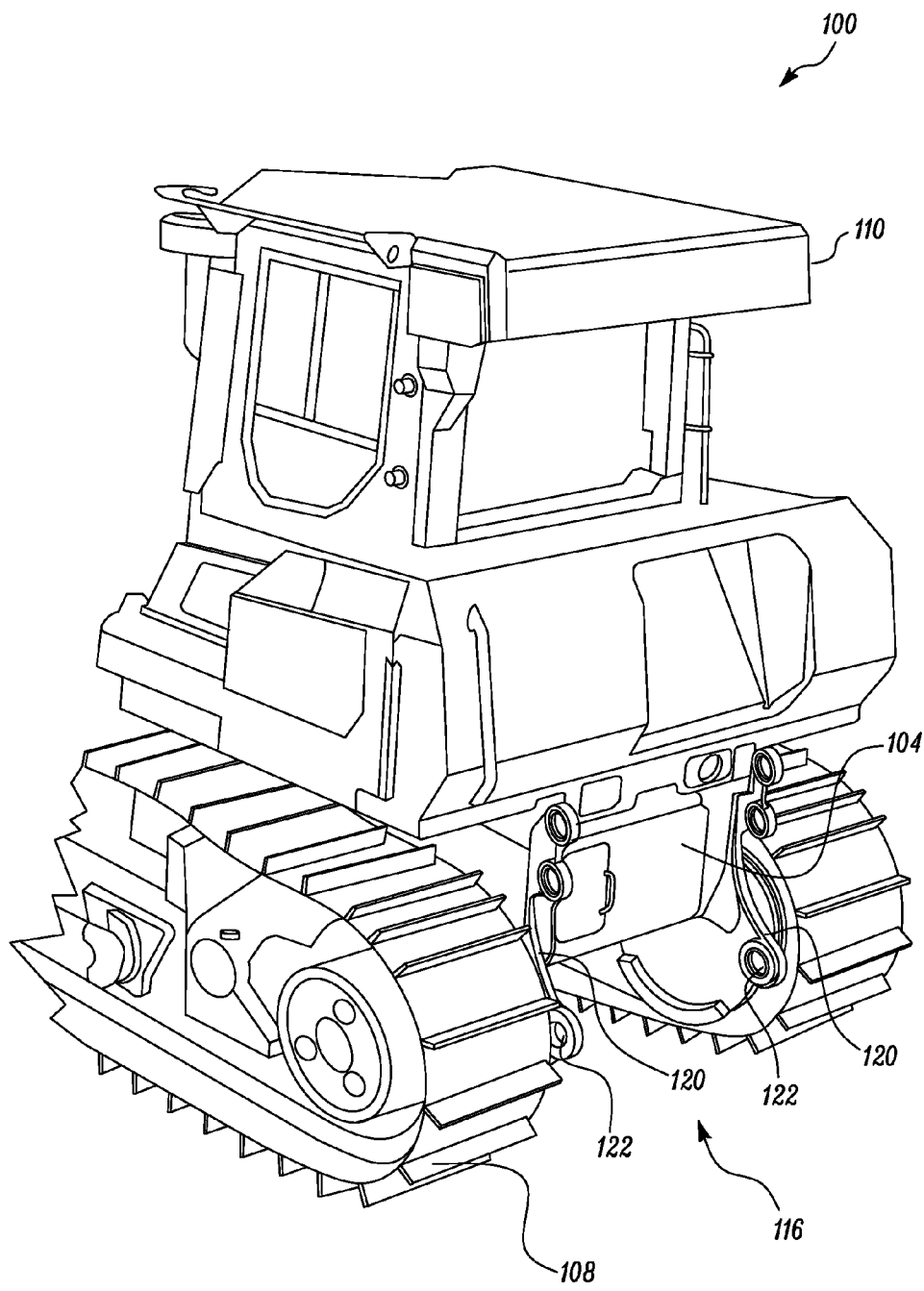
FIG. 3 is a perspective view of a rear end of the machine, according to an embodiment of the present disclosure.

FIG. 3 is a perspective view of the rear end 116 of the machine 100, according to an embodiment of the present disclosure. The rear end 116 of the machine 100 is provided with a pair of mounting plates 120. The mounting plate 120 may be an elongated plate having plurality of openings 122 provided therein. Each of the pair of mounting plates 120 may be vertically disposed at the rear end 116 of the machine 100 and spaced apart from each other. The mounting plate 120 may be an integral part of the frame 104 of the machine 100. However, in an alternative embodiment, the mounting plate 120 may be detachably mounted on the frame 104. In various other embodiments, the mounting plate 120 may be formed in any shape configured to include the openings 122. The openings 122 in the mounting plate 120 may be configured to detachably couple the accessory attachment system 102 to the frame 104 of the machine 100. In other embodiments, the mounting plate 120 may be provided with various other coupling members, such as, a lock, a clamp, and the like, to detachably couple the accessory attachment system 102.

Figure 4:
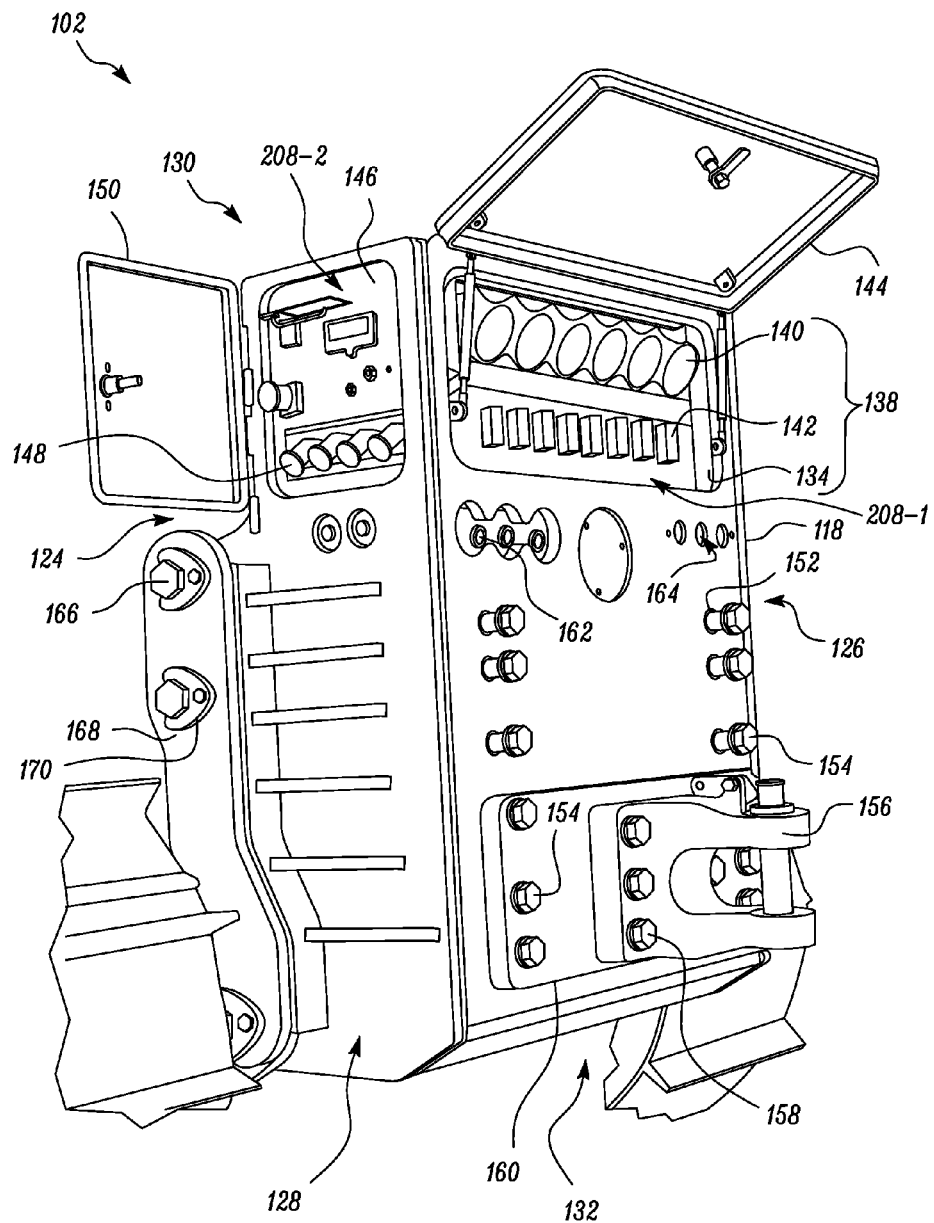
FIG. 4 is a perspective view of the accessory attachment system, according to an embodiment of the present disclosure.

FIG. 4 shows a perspective view of the accessory attachment system 102 according to an embodiment of the present disclosure. The housing 118 includes a first side 124 facing the machine 100 and a second side 126 opposite to the first side 124. The housing 118 further includes lateral sides 128. The housing 118 also includes a top side 130 and a bottom side 132. The second side 126, the lateral sides 128, the top side 130 and the bottom side 132 of the housing 118 are configured to enclose one or more connectors for connection of one or more external devices. The one or more connectors provide communication between the machine systems, such as the electrical system 106 and/or the hydraulic system 200 and the one or more external devices.

The one or more connectors of the accessory attachment system 102 may include a first connector and a second connector. The first connector may be configured to provide communication between the electrical system 106 of the machine 100 and an external electrical device and the second connector may be configured to provide communication between the hydraulic system 200 of the machine 100 and an external hydraulic device. The first connector and the second connector may be hereinafter referred as "electric connectors" and "fluid connectors", respectively. The electric connectors and the fluid connectors are described hereinafter in detail.

A first enclosure 134 may be defined in the second side 126 adjacent to the top side 130 of the housing 118. The first enclosure 134 includes the electric power interface 208-1. Further, the electric power interface 208-1 includes a plurality of electric connectors 138 that may be electrically configured with the electrical system 106 of the machine 100. The plurality of electric connectors 138 may further include a first set of electric connectors 140 and a second set of electric connectors 142. The first set of electric connectors 140 may be configured with the electrical system 106 to provide a multiphase electric power. The second set of electric connectors 142 may be configured with the electrical system 106 to provide single-phase electric power. A first door 144 may be pivotally coupled with the housing 118 at the second side 126 thereof to cover the first enclosure 134 so as to avoid the plurality of electric connectors 138 from getting exposed to unfavorable ambient conditions, such as dust and moisture, when the electric connectors 138 are not in use.

A second enclosure 146 may be defined in the lateral side 128 adjacent to the top side 130 of the housing 118. The second enclosure 146 includes the electric power interface 208-2. Further, the electric power interface 208-2 may include electric connectors 148 that may be electrically configured with the electrical system 106. A second door 150 may be pivotally coupled with the housing 118 at the lateral side 128 thereof to cover the second enclosure 146 so as to avoid the electric connectors 148 from being exposed to unfavorable ambient condition when the electric connectors 148 are not in use. In various other embodiments, the electric power interface 208 in the first enclosure 134 and the second enclosure 146 may further include various electrical components including, but not limited to, electric power meter, fuse, circuit breakers, multiple indicators, displays and an emergency shutdown switch.

The housing 118 of the accessory attachment system 102 further includes a plurality of holes 152 at the second side 126 thereof. Each of the holes 152 may be a threaded hole adapted to receive a bolt 154 therein. Each of the plurality of holes 152 and the corresponding bolt 154 are disposed on the second side 126 of the housing 118 to detachably couple one or more hydraulic devices. In an embodiment, a drawbar assembly 156 may be detachably mounted on the second side 126 of the housing 118. The drawbar assembly 156 may be detachably mounted on the accessory attachment system 102 for coupling various equipment, for example, ploughs and tillers. Also, the drawbar assembly 156 of the machine 100 may be used for hauling trailers. The second side 126 of the housing 118 may be provided with a plurality of bolts 158 for detachably mounting the drawbar assembly 156 with the housing 118. In another embodiment, the drawbar assembly 156 may be detachably mounted on the housing 118 via a plate 160. The plate 160 may be provided with first set of holes adapted to detachably mount the drawbar assembly 156 via the bolts 158 and further provided with second set of holes adapted to be detachably mounted on the housing 118 via the bolts 154. Thus, position of the drawbar assembly 156 may be varied vertically in the housing 118 by detachably mounting the plate 160 with the housing 118 via the bolts 154.

The second side 126 of the housing 118 is further provided with a first set of fluid connectors 162 and a second set of fluid connectors 164 as shown in FIG. 4. The first set of fluid connectors 162 and the second set of fluid connectors 164 may be fluidly communicated with the hydraulic system 200 of the machine 100. The first and the second set of fluid connectors 162, 164 may be adapted to fluidly couple with the hydraulic device that is detachably mounted on the second side 126 of the housing 118. Further, the first set of fluid connectors 162 of the accessory attachment system 102 may be coupled to the second junction 238-2 to detachably communicate the accessory attachment system 102 to the hydraulic system 200 of the machine 100.

The lateral sides 128 of the housing 118 is provided with a plurality of pins 166 corresponding to the plurality of openings 122 (shown in FIG. 3) provided in the mounting plate 120. The plurality of pins 166 extends from the lateral side 128 of the housing 118. Further, the pins 166 are configured to be fully received through the openings 122 of the mounting plate 120 during an attached condition of the accessory attachment system 102 with the mounting plate 120. The accessory attachment system 102 may further include a locking plate 168. The locking plate 168 may be an elongated plate having a shape in conformance with the shape of the mounting plate 120. The locking plate 168 may further include a plurality of holes in alignment with the plurality of openings 122 provided in the mounting plate 120 adapted to receive the pin 166 therethrough. In the attached condition of the accessory attachment system 102 with the mounting plate 120, the locking plate 168 may be inserted over the pins 166 and secured to the pins 166 via respective retainers 170.

Figure 5:
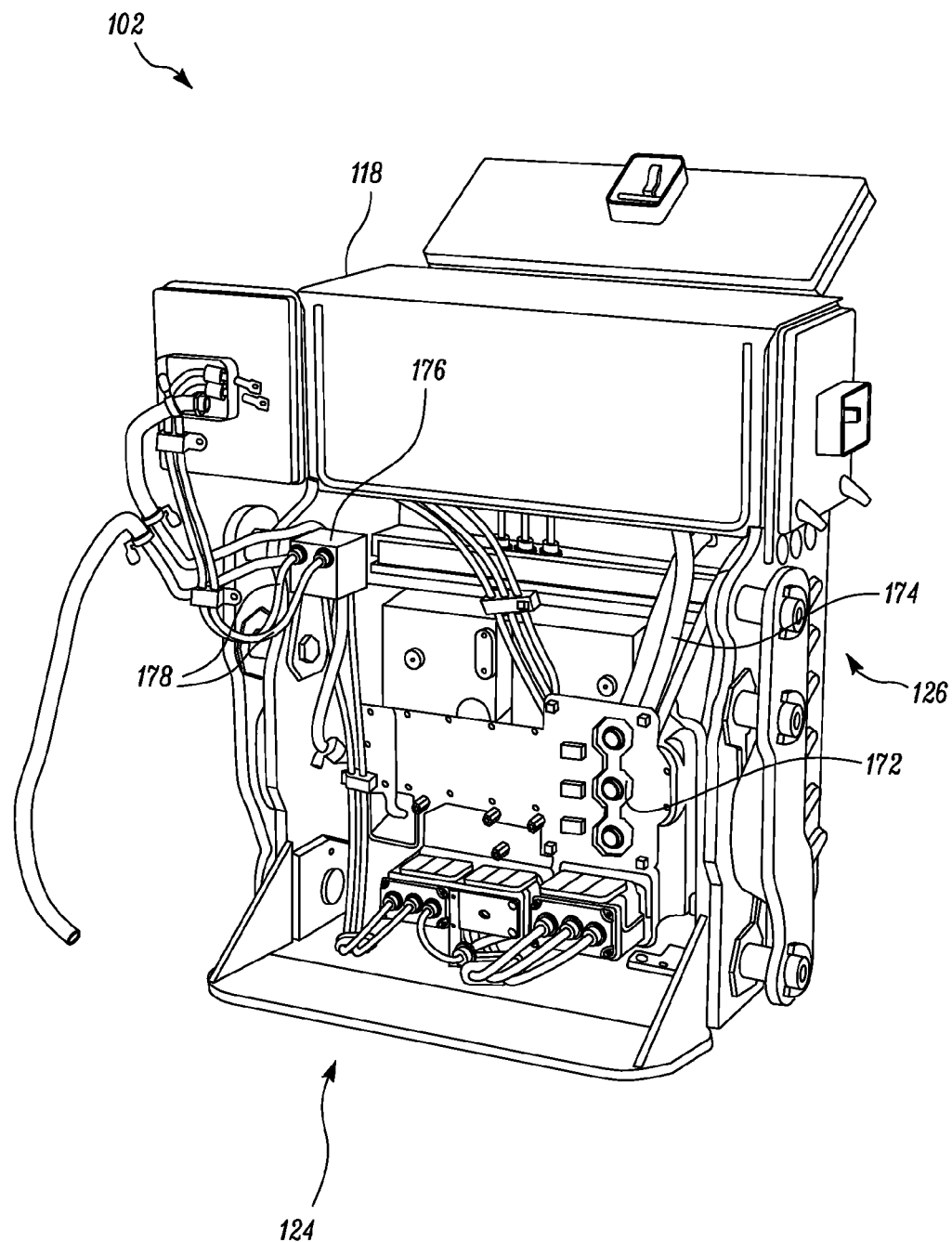
FIG. 5 is another perspective view of the accessory attachment system, according to an embodiment of the present disclosure.

FIG. 5 shows another perspective view of the accessory attachment system 102, according to an embodiment of the present disclosure. The first side 124 of the housing 118 includes a set of fluid inlets 172. Each of the fluid inlets 172 may be fluidly coupled with a corresponding connector of the first set of fluid connectors 162 via a fluid line 174. The fluid inlets 172 may be disposed at the first side 124 of the housing 118 in order to fluidly communicate with the hydraulic system 200 of the machine 100. Thus, any hydraulic device that may be attached at the second side 126 of the housing 118 may be fluidly coupled with the hydraulic system 200 via the fluid line 174. Further, the first side 124 of the housing 118 may include an electric connection junction box 176. The electric connection junction box 176 may include a pair of cables 178 configured to electrically couple with the electrical system 106 of the machine 100. The pair of cables 178 may be configured to detachably couple with the electrical system 106. The pair of cables 178 may be further communicated with various electrical components including, but not limited to, the auxiliary power converter unit 220 (shown in FIG. 2). The auxiliary power converter unit 220 may be further communicated with the electric power interfaces 208 provided the housing 118 of the accessory attachment system 102 to selectively provide electric power to one or more detachable external devices.

Figure 6:
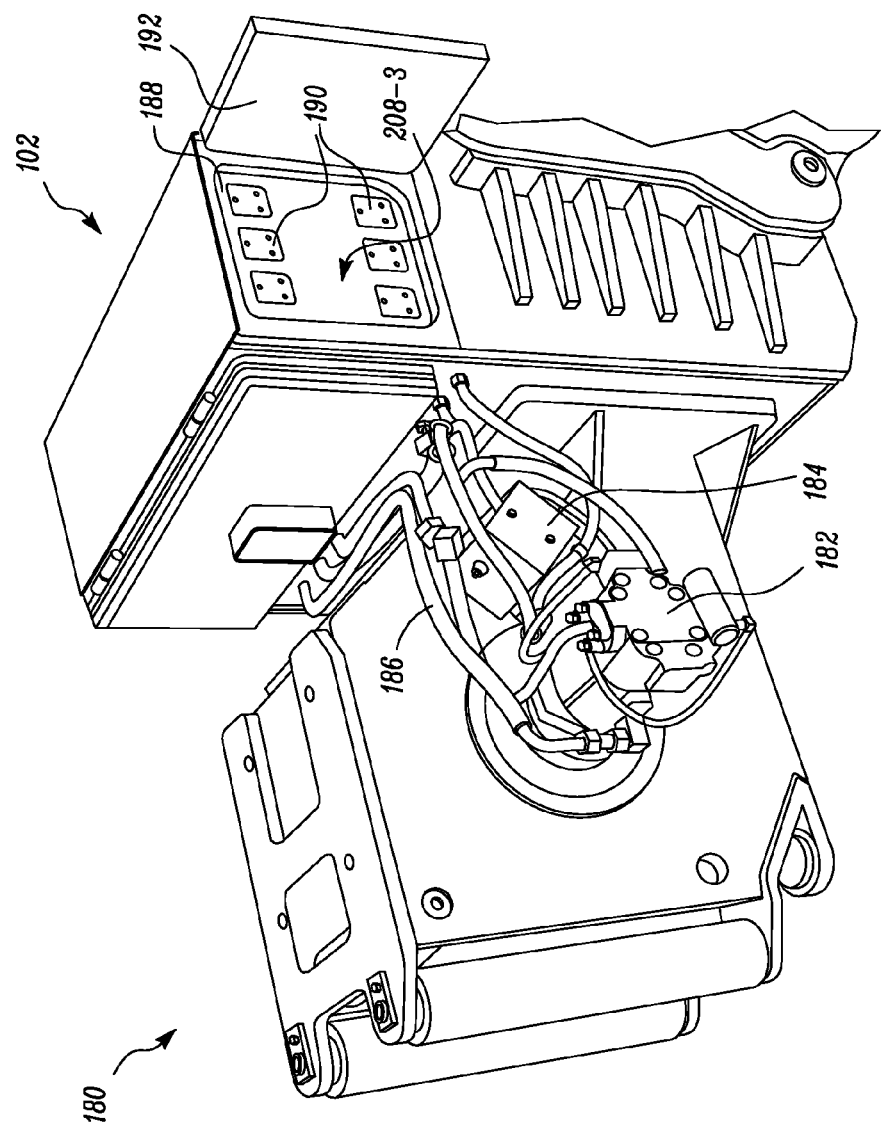
FIG. 6 is a perspective view of the accessory attachment system including a hydraulic winch, according to an embodiment of the present disclosure.

FIG. 6 shows a perspective view of the accessory attachment system 102 attached with a hydraulic winch 180, according to an embodiment of the present disclosure. The hydraulic winch 180 may be one of the hydraulic devices that are detachably coupled with the second side 126 of the housing 118. The hydraulic winch 180 may be detachably coupled with the housing 118 via the bolts 154 after removing the drawbar assembly 156 from the accessory attachment system 102 The hydraulic winch 180 includes a hydraulic motor 182 to provide a rotational power to the hydraulic winch 180. The hydraulic motor 182 may be further communicated with a valve 184 that may be further fluidly connected to the first and second set of fluid connectors 162, 164 via a plurality of fluid lines 186. The hydraulic winch 180 may include a spool (not shown) driven by the by the hydraulic motor 182. The spool may be configured to wind or unwind a cable or rope. In an embodiment, the valve 184 may be a solenoid valve configured to be electrically actuated. The valve 184 may be actuated in response to a control signal from a controller (not shown). The controller may be electrically connected with the electric power interface 208 of the accessory attachment system 102. Further, the plurality of fluid lines 186 may be fluidly communicated with the hydraulic system 200 of the machine 100 via the accessory attachment system 102. The hydraulic motor 182 may be selectively actuated by the valve 184 upon receipt of the control signal from the controller based on an input from an operator. Thus, the hydraulic winch 180 is selectively powered by the hydraulic system 200 of the machine 100.

As shown in FIG. 6, a third enclosure 188 is defined in the lateral side 128 adjacent to the top side 130 of the housing 118. The third enclosure 188 includes the electric power interface 208-3. Further, the electric power interface 208-3 may include a plurality of electric connectors 190 that may be electrically configured with the electrical system 106 of the machine 100. A third door 192 may be pivotally coupled with the housing 118 at the lateral side 128 thereof to cover the third enclosure 188.

INDUSTRIAL APPLICABILITY

Machines are used to perform various tasks such as, digging, dozing, loading, tilling, hauling and other similar tasks. The power required for these tasks are derived from a power source of the machine. Apart from these tasks, it may be desirable to enhance functionality and usage of a single machine for performing multiple functions within a worksite so as to avoid transportation of additional devices that may be required to perform various others tasks such as, for example, welding. However, the power source available for an existing electrical system and hydraulic system of the machines may not be directly usable for performing these additional tasks.

The present disclosure relates to the accessory attachment system 102 detachably attached to the rear end 116 of the machine 100. The accessory attachment system 102 includes the power interfaces 208-1, 208-2 and 208-3 in the first, second and third enclosures 134, 146 and 188, respectively, of the housing 118 to selectively provide electric power to one or more detachable external devices. The electric connectors 138, 148, 190 associated with the power interfaces 208 are configured to provide multiphase electric power and single phase electric power to detachably connected external devices based on the power requirements of the external devices. The power interfaces 208-1, 208-2, 208-3 in the first enclosure 134, the second enclosure 146 and the third enclosure 188 are configured to enable the accessory attachment system 102 to supply the electric power to various types of external devices simultaneously.

In an exemplary application, the machine 100 may be used for a pipe-laying operation. In the pipe-laying operation, the pipes may be laid within a previously dug trench. In a typical operation, after the pipe is laid, the machine 100 may become idle till the pipes are welded. A separate stand-alone generator may be used for welding the pipe. However, this may reduce productivity of the operation. With the accessory attachment system 102 of the machine 100, the electric power from the electrical system 106 of the machine 100 may be utilized for welding the pipes. Hence, the machine 100 may perform pipe laying operation and welding operation simultaneously and thereby productivity of the pipe laying operation may be increased. The electric power interface 208 of the accessory attachment system 102 is also configured to be compatible with a customer designed platform or a mounting plate of the external electrical device, for example, pump that is used for irrigation purpose in agricultural field.

The first set of electric connectors 140 may be used for supplying power to the external electrical devices such as, a welding machine and a compressor that are required to be operated with the electric power in three-phase. Similarly, the second set of electric connectors 142 may be used for supplying power to the external devices such as, power tools, consumer electrical appliances that are required to be operated with the electric power in single-phase. The electric connectors 148 provided in the second enclosure 146 may provide single phase electric power which may be used to power various types of power generating devices.

The first set of fluid connectors 162 and the second set of fluid connectors 164 provided in the housing 118 of the accessory attachment system 102 allow one or more hydraulic devices, such as the hydraulic winch 180, to selectively communicate with the hydraulic system 200 of the machine 100. The hydraulic winch 180 is detachably coupled with the housing 118 at the second side 126 thereof via bolts 154. Further, the second side 126 of the housing 118 is provided with the bolts 158 for detachably mounting the drawbar assembly 156. Hence, the housing 118 is adapted to interchangeably use the hydraulic winch 180 and the drawbar assembly 156. Further, the second side 126 of the housing 118 may be configured with additional plurality of bolts 154 to be compatible with a customer designed platform or a mounting plate of various other hydraulic devices. For example, operators who are performing pipe-laying operations may utilize the fluid connectors 162, 164 and/or the plurality of bolts 154 provided in the housing 118 for detachably mounting a hoist or other devices. The plurality of bolts 154 provided at the second side 126 of the housing 118 may be configured to be compatible with detachably attaching both the external electrical device and the hydraulic devices as desired by the operator.

In other implementations, various hydraulic actuators, such as hydraulic cylinder and hydraulic motors may be detachably mounted on the housing 118 of the accessory attachment system 102. The hydraulic actuators may be selectively powered by the hydraulic system 200 of the machine 100.

The accessory attachment system 102 includes the plurality of pins 166 for detachably coupling the accessory attachment system 102 with the mounting plate 120 disposed on the frame 104 of the machine 100. The mounting arrangement of the accessory attachment system 102 with the machine 100 may enable the operator to conveniently attach the accessory attachment system 102 with the machine 100. In addition, the accessory attachment system 102 may be easily removable from the machine 100 and transported to a new worksite for use with another machine. Also, the accessory attachment system 102 may allow powering of various types of external electrical devices and/or hydraulic devices by the power source 202 of the machine 100. Further, the hydraulic devices may be conveniently attached to or removed from the housing 118. This may help the operator to meet the requirements of additional tasks with a single machine without transporting additional equipment for the same task.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An accessory attachment system for a machine, the accessory attachment system comprising:
   a housing configured to be detachably coupled with the machine;
   a plurality of electric connectors disposed in the housing, the plurality of electric connectors being communicably coupled with an electrical system of the machine, wherein the plurality of electric connectors is configured to selectively provide electric power to one or more detachable external devices;
   a fluid connector disposed in the housing, the fluid connector being in fluid communication with a hydraulic system of the machine; and
   a hydraulic device detachably coupled with the housing, the hydraulic device comprising a device fluid connector configured to be fluidly coupled with the fluid connector of the housing, wherein the hydraulic device is selectively powered by the hydraulic system of the machine.

2. The accessory attachment system of claim 1, wherein the housing comprises one or more doors to selectively enclose at least some of the plurality of electric connectors.

3. The accessory attachment system of claim 1, wherein the plurality of electric connectors comprises a first set of electric connectors configured to provide multiphase electric power, and a second set of electric connectors configured to provide single-phase electric power.

4. The accessory attachment system of claim 1, wherein the housing comprises a pin extending from a lateral side thereof, the pin being detachably coupled with a frame of the machine.

5. The accessory attachment system of claim 1, wherein the housing comprises a first side facing the machine and a second side opposite to the first side facing the hydraulic device, wherein a plurality of bolts are disposed on the second side to detachably couple the hydraulic device to the second side of the of the housing.

6. The accessory attachment system of claim 5, wherein housing further comprises a drawbar assembly detachably mounted on the second side of the housing.

7. The accessory attachment system of claim 1, wherein the hydraulic device is a hydraulic winch.

8. A machine comprising:
   a frame;
   a power source disposed within the frame;
   an electrical system powered by the power source;
   a hydraulic system powered by the power source; and
   an accessory attachment system detachably coupled with the frame of the machine, the accessory attachment system comprising:
      a housing configured to be detachably coupled with the machine;
      a plurality of electric connectors disposed in the housing, the plurality of electric connectors being communicably coupled with the electrical system of the machine, wherein the plurality of electric connectors is configured to selectively provide electric power to one or more detachable external devices;

a fluid connector disposed in the housing, the fluid connector being in fluid communication with the hydraulic system of the machine; and a hydraulic device detachably coupled with the housing, the hydraulic device comprising a device fluid connector configured to be fluidly coupled with the fluid connector of the housing, wherein the hydraulic device is selectively powered by the hydraulic system of the machine.

9. The machine of claim 8, wherein the housing comprises one or more doors to selectively enclose at least some of the plurality of electric connectors.

10. The machine of claim 8, wherein the plurality of electric connectors comprises a first set of electric connectors configured to provide multiphase electric power, and a second set of electric connectors configured to provide single-phase electric power.

11. The machine of claim 8, wherein the housing comprises a pin extending from a lateral side thereof, the pin being detachably coupled with the frame of the machine.

12. The machine of claim 8, wherein the housing comprises a first side facing the machine and a second side opposite to the first side facing the hydraulic device, wherein a plurality of bolts are disposed on the second side to detachably couple the hydraulic device to the second side of the of the housing.

13. The machine of claim 12, wherein housing further comprises a drawbar assembly detachably mounted on the second side of the housing.

14. The machine of claim 8, wherein the hydraulic device is a hydraulic winch.

15. The machine of claim 8, wherein the machine is a track type tractor.

16. An accessory attachment module for a machine comprising:

a housing configured to be detachably coupled to a frame of the machine, the housing including one or more junctions for cooperation with one or more machine systems; and one or more connectors disposed in the housing, the connectors configured for connection of one or more external devices, wherein the one or more connectors provide communication between the one or more machine systems and the one or more external devices, wherein the one or more junctions cooperate with an electrical system of the machine, and wherein the one or more connectors includes a first set of electric connectors configured to provide multiphase electric power, and a second set of electric connectors configured to provide single phase power.

17. The accessory attachment module of claim 16, wherein the one or more junctions cooperate with a hydraulic system of the machine.

* * * * *